(12) United States Patent
Slaight (10) Patent No.: US 8,776,080 B2
(45) Date of Patent: Jul. 8, 2014

(54) MANAGEMENT COMPONENT TRANSPORT PROTOCOL INTERCONNECT FILTERING AND ROUTING

(75) Inventor: Thomas M. Slaight, Beaverton, OR (US)

(73) Assignee: Intel Corporationa, Santa Clara, CA (US)

(*) Notice: Subject to any disclaimer, the term of this patent is extended or adjusted under 35 U.S.C. 154(b) by 1224 days.

(21) Appl. No.: 11/861,177

(22) Filed: Sep. 25, 2007

(65) Prior Publication Data
US 2009/0083760 A1    Mar. 26, 2009

(51) Int. Cl.
*G06F 3/00* (2006.01)

(52) U.S. Cl.
USPC .......................... 719/310; 709/224

(58) Field of Classification Search
USPC .......................... 719/310; 709/224
See application file for complete search history.

(56) References Cited

U.S. PATENT DOCUMENTS

| | | | | |
|---|---|---|---|---|
| 5,600,644 | A * | 2/1997 | Chang et al. | 370/404 |
| 6,757,281 | B1 * | 6/2004 | Irish | 370/389 |
| 6,826,272 | B1 * | 11/2004 | Dalrymple et al. | 379/220.01 |
| 7,028,092 | B2 * | 4/2006 | MeLampy et al. | 709/230 |
| 7,139,387 | B2 | 11/2006 | Dahari | |
| 7,162,306 | B2 | 1/2007 | Caby et al. | |
| 7,529,860 | B2 * | 5/2009 | Freimuth et al. | 710/8 |
| 2003/0097160 | A1 * | 5/2003 | Caby et al. | 607/60 |
| 2003/0163520 | A1 * | 8/2003 | Bussani et al. | 709/203 |
| 2004/0076281 | A1 * | 4/2004 | Dahari | 379/229 |
| 2006/0288098 | A1 * | 12/2006 | Singh et al. | 709/224 |

FOREIGN PATENT DOCUMENTS

TW    595235    6/2004

OTHER PUBLICATIONS

Philips Semiconductors, The I2C-bus specification, 2000.*
"Management Component Transport Protocol (MCTP) Overview, White Paper", Version 1.0.0a, Distributed Management Task Force, Jul. 2007, pp. 1-15. Retrieved from dmtf.org/standards/published_documents/DSP2016.pdf.
Egevang et al., "RFC1631—The IP Network Address Translator (NAT)", May 1994, Available at: faqs.org/rfcs/rfc1631.html>; 8 pgs.
"Transparent Bridging", Chapter 23 of "Internet Technologies Handbook". Posted: Thursday, Oct. 12, 2006. Retrieved from cisco.com/univercd/cc/td/doc/cisintwk/ito_doc/transbdg.htm#wp1021881.
Office action for Chinese Application No. 200810161022.0, mailed Dec. 5, 2012, 16 pages.
Office action for Chinese Application No. 200810161022.0, mailed Dec. 27, 2010.
Office action for Chinese Application No. 200810161022.0, mailed Apr. 6, 2012.
Office action for Taiwan Application No. 97136305, mailed Apr. 17, 2012.
Office action for German Application No. 10 2008 049 018.0, mailed Mar. 19, 2010.
Office action for German Application No. 10 2008 049 018.0, mailed Dec. 3, 2010.

* cited by examiner

*Primary Examiner* — Lechi Truong
(74) *Attorney, Agent, or Firm* — Schwabe, Williamson & Wyatt, P.C.

(57) ABSTRACT

A method, apparatus, and system are disclosed. In one embodiment, the method includes rerouting a Vendor Defined Message (VDM) sent from a first device is targeting a second device, to a third device. The method also includes keeping the first device unaware of the rerouting.

23 Claims, 5 Drawing Sheets

MANAGEMENT COMPONENT TRANSPORT PROTOCOL INTERCONNECT FILTERING AND ROUTING

FIELD OF THE INVENTION

The invention is related to the Management Component Transport Protocol (MCTP). More specifically, the invention is related to rerouting MCTP packets that are targeting one device, to another device.

BACKGROUND OF THE INVENTION

The Management Component Transport Protocol (MCTP) is a protocol for intercommunication among intelligent devices within a platform management subsystem in a computer system using one or more buses. MCTP is independent of the underlying bus physical layer properties, as well as the data-link layer messaging used on the bus.

The MCTP defines a bus as an interconnect between platform components that share a common physical layer address space. A bus may be made up of multiple segments. A bus segment is a portion of a bus that is electrically separated from other segments that form a bus, but still shares a common physical address space with other segments.

The physical and data-link layer methods for MCTP communication across a given common medium are defined by companion "transport binding" specifications, such as, for example, MCTP over PCI Express® Vendor Defined Messaging (PCI Express® will hereafter be defined by the PCI Express® Base Specification, Revision 1.0a, Apr. 15, 2003). MCTP has been designed to carry multiple types of manageability-related traffic across the common medium.

Common MCTP subsystem devices include one or more Management Devices, each of which is typically implemented using a microcontroller and accessed through a messaging protocol. Another common MCTP subsystem device is a Management Controller, which is a microcontroller or processor that aggregates management parameters from one or more Management Devices and makes access to those parameters available to local or remote software, or to other Management Controllers. A Management Controller also may interpret and process management-related data, and initiate management-related actions on one or more Management Devices. The microcontroller or processor that serves as a Management Controller can also incorporate the functions of a Management Device.

The MCTP can provide efficient communications between many different MCTP subsystem devices, such as communication between a management controller and a management device, between a two or more different management controllers, as well as between management controllers and general computer system components such as system firmware or network controllers.

MCTP also provides support for multiple standard interconnect protocols such as the PCI Express® protocol, as mentioned above, using Vendor Defined Messages (VDM), the System Management Bus (SMBus), Inter-Integrated Circuit ($I^2C$), and Universal Serial Bus (USB), among others.

MCTP data packets can be transferred between MCTP devices, such as management controllers and management devices. To transfer data between devices using the MCTP, endpoints are defined, where each endpoint is the function within a device that terminates the communication protocol of MCTP and handles MCTP Control commands. MCTP uses a logical address called the endpoint ID (EID) for addressing and routing MCTP packets to and from endpoints.

An EID includes the entire logical device address that is utilized on the bus the device is coupled to. For example, in PCI Express®, the logical device addressed by a request has an EID that is a combination of a bus number, device number, and function number that can uniquely identify the logical device.

An MCTP bus must have a Bus Owner, which is a device responsible for supporting device discovery as well as assigning an endpoint identification (EID) address to each MCTP Management Device and MCTP Management Controller. For MCTP over PCI Express®, the Bus Owner function is required by MCTP to be accessed by having MCTP Packets routed to and from the VDM message routing for the PCI Express® Root Complex. Having the Root Complex device directly incorporate the Bus Owner functions requires the Root Complex to have a fairly large amount of additional logic. Additionally, this logic may need to change if new functions are required.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Embodiments of a method, apparatus, and system to reroute a Management Control Transport Protocol (MCTP) manageability message from one device to a second device are described. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
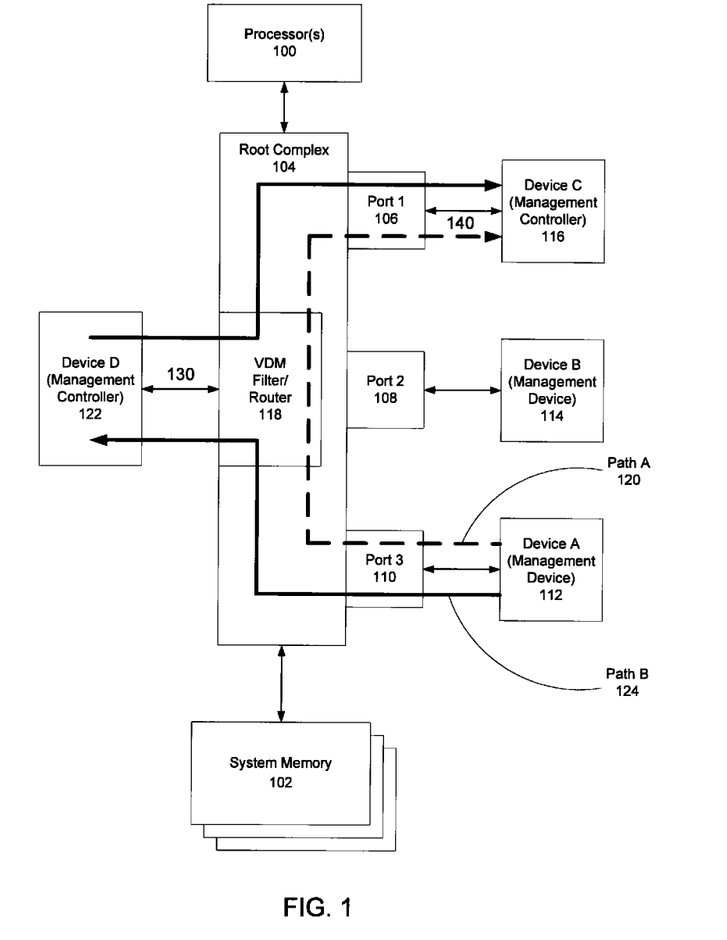
FIG. 1 describes one embodiment of a system capable of rerouting a Vendor Defined Message (VDM) from one device to another device.

FIG. 1 describes one embodiment of a system capable of rerouting a Vendor Defined Message (VDM) from one device to another device. In many embodiments, the system shown in FIG. 1 comprises a platform management subsystem within a computer system. The devices in the platform management subsystem may communicate with each other through a Management Control Transport Protocol (MCTP).

The computer system that the platform management subsystem is a part of can be a server, workstation, desktop, mobile or other computing device. In many embodiments, the computer system includes one or more processors 100. Each of the processors 100 may have one or more processor cores in different embodiments. The processor cores are not shown in FIG. 1. The computer system also includes system memory 102 to store instructions that can be executed by the one or more processors 100. System memory 102 is capable of being accessed by a memory controller also included in the computer system (not shown). In some embodiments, the memory controller is integrated into a northbridge of a chipset in the computer system. In other embodiments, the memory controller is integrated into one or more of the processors 100.

In many embodiments, a PCI Express® Root Complex 104 is located in the computer system. The Root Complex 104 is coupled to both the one or more processors 100 and system memory 102. In many embodiments, the Root Complex 104 is the root of the I/O hierarchy that connects the processor and memory subsystem to the I/O subsystem. The Root Complex 104 may support one or more PCI Express® ports, such as ports 1, 2, and 3 (106, 108, and 110, respectively). Since, PCI Express® is a point-to-point interconnect, each PCI Express® port couples the Root Complex 104 to a single device. For example, each device coupled to a port may be an endpoint, a switch, or a bridge, among other devices.

In many embodiments, the Root Complex 104 and the devices coupled to it may create a platform management subsystem that utilizes the MCTP for intercommunication. In the pictured embodiment in FIG. 1, the PCI Express® bus, which includes the interconnects between each PCI Express®-compliant device and the Root Complex 104, may be referred to as the MCTP bus. Furthermore, in many embodiments, each PCI Express® device coupled to the MCTP bus in FIG. 1 may be an MCTP Management Device or MCTP Management Controller. For example, in many embodiments, Device A 112 is a MCTP Management Device that has the capability of sending and receiving MCTP manageability messages through PCI Express® Vendor Defined Messages (VDMs). Device B 114 is also a MCTP Management Device in many embodiments. These devices, Devices A and B, assume that the Root Complex 104 is the Bus Owner and behave accordingly by sending VDMs that need to reach the Bus Owner to the Root Complex 104.

Though, in many embodiments, Device C 116 is a MCTP Management Controller and, furthermore, is the actual Bus Owner of the MCTP bus shown in FIG. 1. In the embodiments where Device C 116 is the Bus Owner, any VDM sent from Device A 112 or Device B 114 to the Bus Owner must be rerouted to Device C 116 because the initial destination address of each of these VDMs targets the Root Complex 104, which is the assumed Bus Owner per Devices A and B.

Thus, in some embodiments, the Root Complex 104 includes a VDM Filter and Router component 118 that receives any VDM targeting the Bus Owner and reroutes the VDM to Device C 116, the Management Controller that is the actual Bus Owner. In some embodiments, the rerouting can be accomplished in the VDM Filter and Router component 118 with a state machine. The state machine can determine the target of an incoming VDM and if the target is the Bus Owner and the target address is the Root Complex 104 address, then the state machine can reroute the VDM to the actual Bus Owner. The path of a VDM sent from Device A 112 to the Bus Owner, including the rerouting to Device C 116 by the VDM Filter and Router 118 state machine, is shown by the Path A 120 dashed line.

In many embodiments, Device C 116 is a discrete device. In these embodiments, after Device C 116 is inserted into the platform management subsystem shown in FIG. 1, during an initialization stage, Device C 116 sends out a Routing Update VDM to the Root Complex 104. The Routing Update VDM informs the VDM Filter and Router 118 state machine within the Root Complex 104 of the endpoint ID (EID) address and PCI Express® routing address of the true MCTP Bus Owner. This information may be referred to as routing information and it can be utilized for rerouting VDMs targeting the Root Complex 104 as the Bus Owner to the true MCTP Bus Owner.

The VDM Filter and Router 118 state machine accomplishes the rerouting by simply modifying the destination EID and PCI Express® routing address in the header of the incoming VDM to reflect the EID and PCI Express® routing address of Device C 116 as the new Bus Owner. In many embodiments, this rerouting is completely transparent to the initial sender of the VDM (in this case, Device A 112). Thus, Device A 112 still operates as if the Root Complex 104 is the actual Bus Owner by sending the Root Complex 104 VDMs that are targeting the Bus Owner.

The above embodiments that utilize the VDM Filter and Router 118 state machine rerouting solution takes a significant amount of Bus Owner logic out of the Root Complex 104 and reposition it in Device C 116. Although, in these embodiments, there remains the VDM Filter and Router 118 state machine logic within the Root Complex 104. In many other embodiments, the Bus Owner rerouting state machine does not exist within the Root Complex 104. Rather, all VDMs sent to the Root Complex 104 are automatically forwarded to Device D 122, which is a MCTP Management Controller in many embodiments. In these embodiments, Device D 122 includes firmware that replicates the VDM Filter and Router 118 state machine logic. Thus, the rerouting of a VDM targeting the Root Complex 104 as the Bus Owner still takes place, but now it takes place in firmware on a Management Controller. The path of a VDM sent from Device A 112 to the Bus Owner, including the rerouting to Device C 116 by the firmware within the Device D 122 Management Controller, is shown by the Path B 124 solid line.

Embodiments that utilize the firmware rerouting solution in the Device D 122 Management Controller may be preferential when the objective is to eliminate the greatest amount of logic within the Root Complex 104. Whereas, embodiments that utilize the hardware state machine rerouting solution in the VDM Filter and Router 118 may be preferential when the objective is to decrease the rerouting latency. Embodiments for both solutions allow for a modular approach to implementing a Bus Owner in the platform management subsystem. Instead of having a Bus Owner that is embedded in the Root Complex 104, it is beneficial to have a Bus Owner implementation in a Management Controller device that can be plugged into the system afterward to allow for vendor specific rules for different Bus Owner solutions.

The embodiment of the connection 130 in FIG. 1 between the Root Complex device 104 and MCTP Packet forwarding Management controller Device D is not required to use MCTP-specified protocols or an MCTP-specific bus medium. The routing function in the VDM Filter/Router 118 encapsulates the MCTP messages within an alternate protocol and transfers them with Device D using formatting and addressing specific to the physical medium for the connection. Conversely, encapsulated MCTP message content from Device D is extracted by routing function 118 and formatted into corresponding MCTP Packets delivered to the designated targets on the MCTP bus.

The embodiment of the connection 140 in FIG. 1 between the Root Complex device 104 and Bus Owner Management controller Device C is not required to use PCI Express® or a MCTP-specified protocol or medium. In many embodiments, the routing function in the VDM Filter/Router 118 can encapsulate the MCTP messages within an alternate protocol and transfer the messages to Device C using an alternate physical medium. This alternate physical medium may be USB, SMBus/I2C, RS-232 or other protocol/bus medium combinations, in different embodiments. Additionally, in many embodiments, encapsulated MCTP manageability message content may be sent from Device C and then extracted by the routing function in the VDM Filter/Router 118 and formatted into corresponding MCTP Packets delivered using the designated targets on the MCTP bus.

Figure 2:
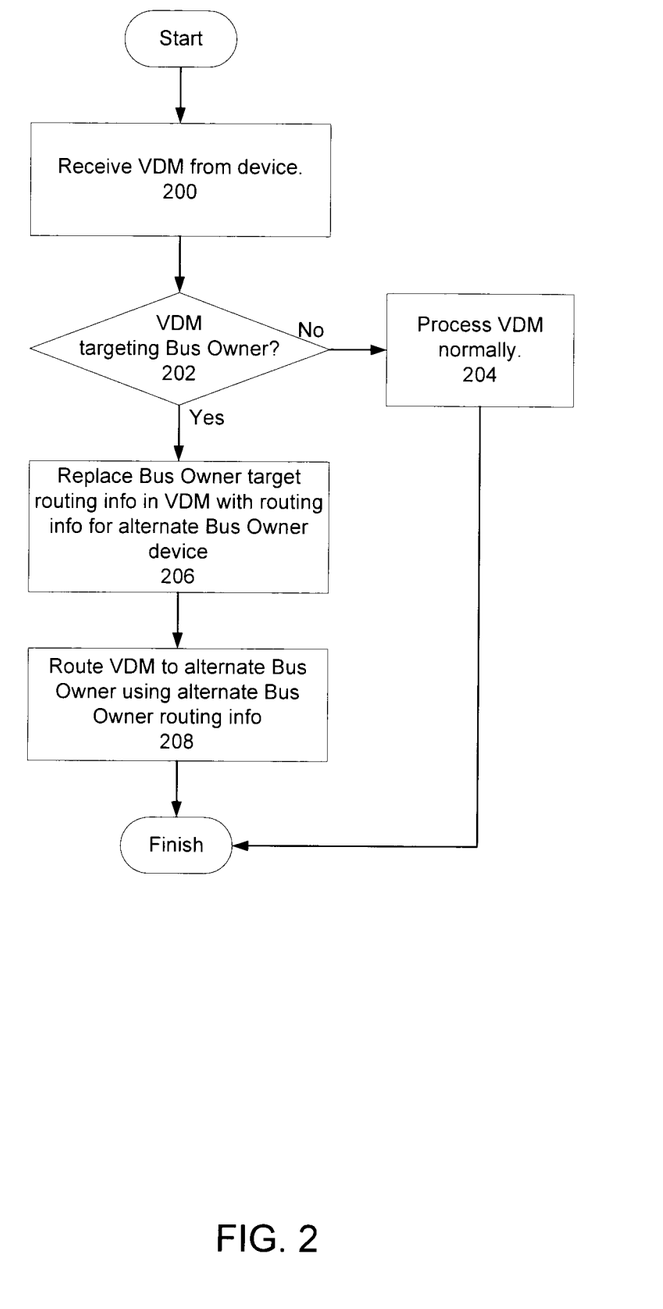
FIG. 2 is a flow diagram of one embodiment of a process to reroute a VDM to and from an alternate device that is providing the functions of the MCTP Bus Owner separate from the device that is implementing the Root Complex.

FIG. 2 is a flow diagram of one embodiment of a process to reroute a VDM to an alternate MCTP Bus Owner directly from a Root Complex. This figure illustrates that the routing function (i.e. the routing logic within a capable device) recognizes the characteristics that identify a message that is targeted for the Bus Owner. In the case of PCI Express®, particular MCTP VDM packets targeting the Bus Owner are identified by their use of "Route to Root Complex" routing in the PCI Express® packet. The process in FIG. 2 is performed by processing logic that may comprise hardware (circuitry, dedicated logic, etc.), software (such as is run on a general purpose computer platform or a dedicated machine), or a combination of both.

Referring to FIG. 2, the process begins by processing logic receiving a VDM from a device (processing block 200). In many embodiments, the device sending the VDM is a MCTP Management Device. In many embodiments, the VDM is sent over a PCI Express® interconnect that comprises a portion of a MCTP bus.

In some embodiments, the sent VDM contains an MCTP manageability message targeting the MCTP Bus Owner. In other embodiments, the sent VDM is for a different purpose and not particularly targeting the MCTP Bus Owner. Thus, processing logic determines whether the VDM is targeting the MCTP Bus Owner or not (processing block 202)

If the VDM does not contain a MCTP manageability message targeting the MCTP Bus Owner, then processing logic continues to process the VDM normally (processing block 204) and the process is finished. Otherwise, if the VDM does contain a MCTP manageability message targeting the MCTP Bus Owner, then processing logic replaces the Bus Owner EID target address currently in the VDM with an alternate Bus Owner EID target address (processing block 206). In many embodiments, the alternate Bus Owner EID target address is targeting a separate MCTP Management Controller on the MCTP bus. This MCTP Manageability Controller is the actual Bus Owner in many embodiments.

The replacement of the target address involves modifying the VDM header target address. In embodiments where the MCTP bus is a group of PCI Express® point to point interconnects, the address in the VDM header includes a unique bus-device-function number or routing field that comprises the PCI Express® routing information. Thus, processing logic replaces the original routing information with alternate routing information that targets the MCTP Bus Owner. Once this happens, processing logic directly reroutes (i.e. forwards) the VDM to the real MCTP Bus Owner using the newly replaced alternate addressing (processing block 208).

In many of the embodiments described in the flow diagram of FIG. 2, processing logic may be located within a PCI Express® Root Complex. The original VDM sending device may believe that the Root Complex is the MCTP Bus Owner. In these embodiments, the Root Complex includes processing logic implemented within Root Complex hardware that comprises a state machine. In many embodiments, the state machine will directly reroute the VDM to the true MCTP Bus Owner (e.g. a MCTP Manageability Controller on the MCTP bus but apart from the Root Complex) without the knowledge of the sending device. Thus, the rerouting is done transparently to the sending device and, therefore, the sending device continues to operate as if the Root Complex is the actual Bus Owner. Additionally, in many of the embodiments described in FIG. 2, since the processing logic within the Root Complex reroutes of the VDM to the true MCTP Bus Owner without sending the VDM to an additional device on the MCTP bus, the term "directly" reroutes is utilized.

Figure 3:
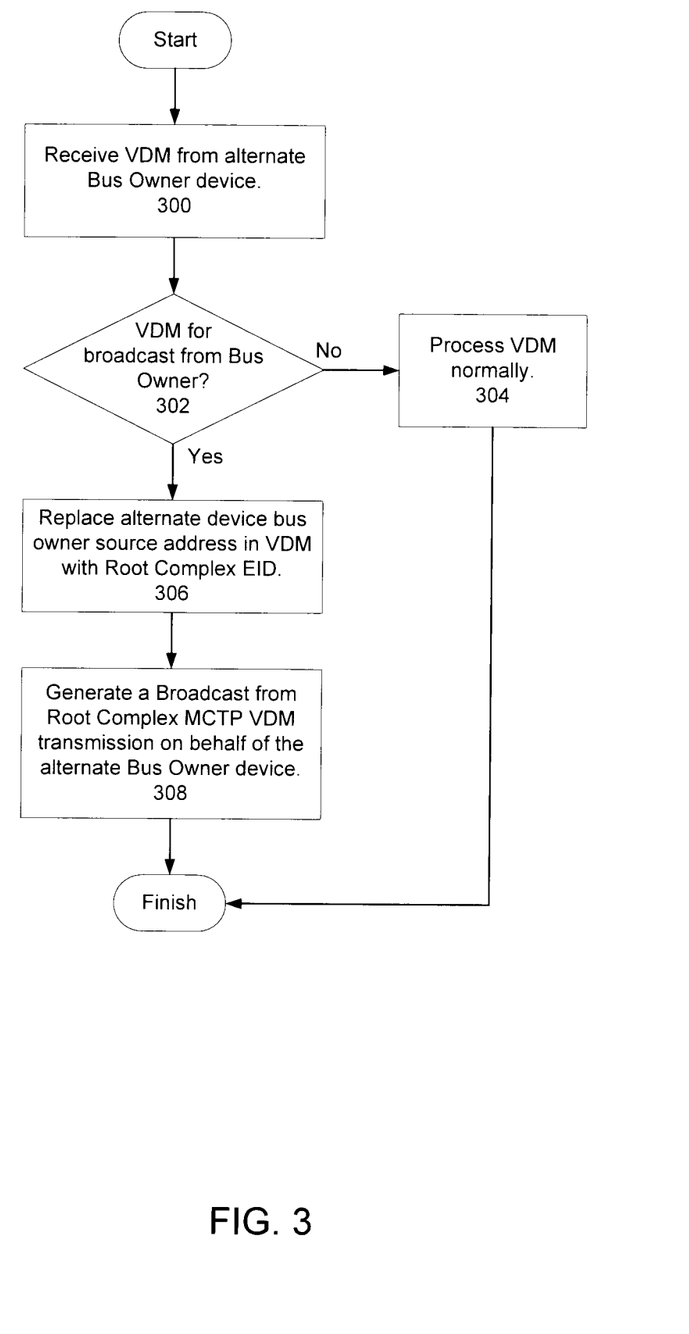
FIG. 3 shows a flow diagram of one embodiment of a process to reroute a VDM to an alternate MCTP Bus Owner where the alternate Bus Owner is an MCTP device.

FIG. 3 is a flow diagram of one embodiment of a process to modify a broadcast message from an alternate MCTP Bus Owner to be generated onto an interconnect. In many embodiments, a Root Complex receives the broadcast message from the alternate MCTP Bus Owner, generates the modified message, and broadcasts the message on the interconnect. FIG. 3 illustrates that the routing function (i.e. routing logic residing within a device) recognizes the characteristics that identify a broadcast message from the alternate Bus Owner that is targeting one or more additional devices on the MCTP bus. In many embodiments, the broadcast message targets all devices on the MCTP bus. The process is performed by processing logic that may comprise hardware (circuitry, dedicated logic, etc.), software (such as is run on a general purpose computer platform or a dedicated machine), or a combination of both.

Referring to FIG. 3, the process begins by processing logic receiving one or more particular MCTP VDM packets from the alternate MCTP Bus Owner device (processing block 300). Processing logic then determines whether the particular VDM(s) received from the alternate Bus Owner are for broadcast (processing block 302). In many embodiments, when a VDM is for broadcast, the VDM is targeting all of the devices (or at least multiple devices) on the MCTP bus. In many embodiments, where the MCTP bus is utilizing the PCI Express® protocol as the transport protocol, the received VDM message utilizes "Broadcast from Root Complex" routing in the PCI Express® packet. If the received VDM is not a broadcast from the Bus Owner, then the VDM can be processed normally (processing block 304). Otherwise, if the received VDM is a broadcast message, then processing logic replaces the alternate Bus Owner device source address in the VDM with the Root Complex EID (processing block 306). This allows any devices that receive the broadcast message from the Root Complex to think that the Root Complex remains as the Bus Owner instead of the true Bus Owner, which is the alternate Bus Owner device. Finally, processing logic generates a "Broadcast from Root Complex" MCTP VDM transmission on behalf of the alternate Bus Owner device and sends the generated broadcast message across the MCTP bus (processing block 308) and the process is finished.

Figure 4:
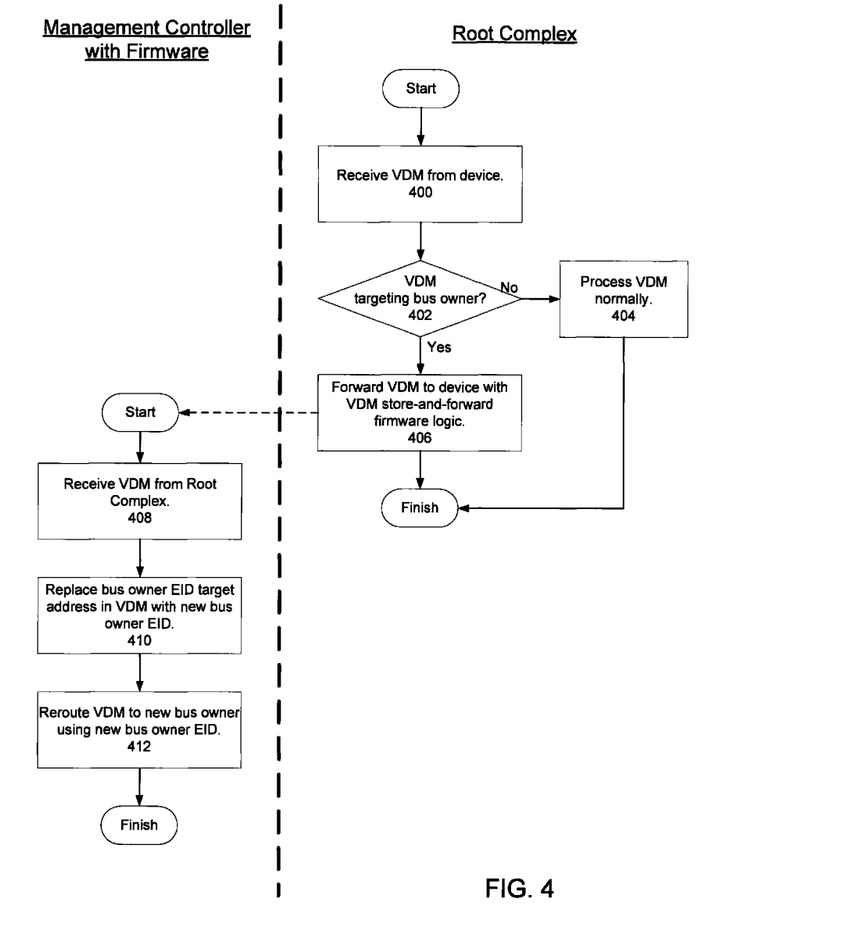
FIG. 4 is a flow diagram of one embodiment of a process to reroute a VDM to an alternate MCTP Bus Owner where the alternate Bus Owner is connected to the Root Complex device using a non-MCTP-specified protocol and transport medium.

FIG. 4 is a flow diagram of one embodiment of a process to reroute a VDM to an alternate MCTP Bus Owner indirectly through an additional MCTP device. The process is performed by processing logic that may comprise hardware (circuitry, dedicated logic, etc.), software (such as is run on a general purpose computer platform or a dedicated machine), or a combination of both. Referring to FIG. 4, the process begins by processing logic receiving a VDM from a device (processing block 400). Again, in many embodiments, the device sending the VDM is a MCTP Management Device. Also, again, in many embodiments, the VDM is sent over a PCI Express® interconnect that comprises a portion of a MCTP bus.

In some embodiments, the sent VDM contains an MCTP manageability message targeting the MCTP Bus Owner. In other embodiments, the sent VDM is for a different purpose and not particularly targeting the MCTP Bus Owner. Thus, processing logic determines whether the VDM is targeting the MCTP Bus Owner or not (processing block 402)

If the VDM does not contain a MCTP manageability message targeting the MCTP Bus Owner, then processing logic continues to process the VDM normally (processing block 404) and the process is finished. Otherwise, if the VDM does contain a MCTP manageability message targeting the MCTP Bus Owner, then processing logic forwards the VDM to a device with VDM store-and-forward firmware logic (processing block 406). In many embodiments, another MCTP Management Controller located on the MCTP bus is a device with VDM store-and-forward firmware logic. The store-and-forward logic replaces the MCTP Bus Owner EID target address currently in the VDM with an alternate MCTP Bus Owner EID target address. In many embodiments, the alternate MCTP Bus Owner EID target address is targeting an additional separate MCTP Management Controller on the MCTP bus. This MCTP Manageability Controller is the actual Bus Owner in many embodiments.

In many of the embodiments described in the flow diagram of FIG. 4, a portion of the processing logic that is located in a PCI Express® Root Complex performs processing blocks 400 through 406. These steps are shown under the Root Complex header to the right of the thick dashed line. Another portion of the processing logic is located within the store-and-forward firmware logic on a separate MCTP Management Controller. This portion of the processing logic performs processing blocks 408 through 412 on the left side of the thick dashed line in FIG. 4.

Continuing the process, processing logic within the store-and-forward firmware first receives the VDM from the processing logic within the Root Complex (processing block 408). Then the store-and-forward firmware processing logic replaces the original EID with an alternate EID that targets the true MCTP Bus Owner (processing block 410). Once this happens, processing logic within the store-and-forward firmware reroutes the VDM to the real MCTP Bus Owner using the newly replaced alternate addressing (processing block 412).

Again, in many embodiments, the store-and-forward firmware processing logic will reroute the VDM to the true MCTP Bus Owner (e.g. a MCTP Manageability Controller on the MCTP bus but apart from the Root Complex) without the knowledge of the original sending device. Thus, the rerouting is done transparently to the original sending device and, therefore, the original sending device continues to operate as if the Root Complex is the actual Bus Owner.

Figure 5:
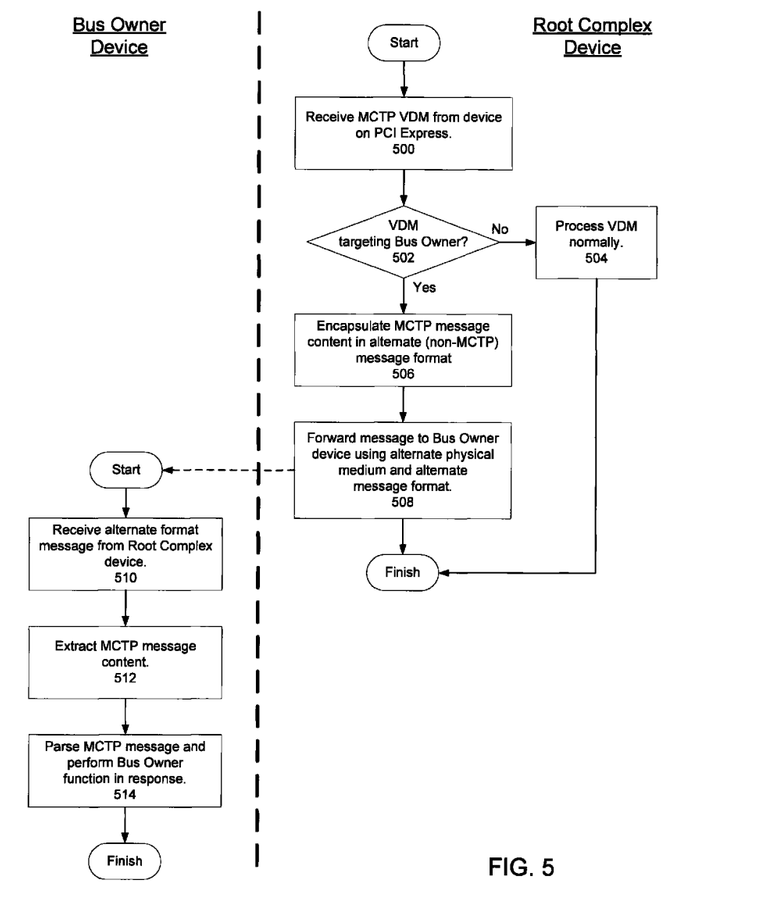
FIG. 5 is a flow diagram of one embodiment of a process to encapsulate an MCTP VDM targeting a Bus Owner in an alternate message format and sending the encapsulated VDM across an alternate physical medium to reach the Bus Owner.

FIG. 5 is a flow diagram of one embodiment of a process to encapsulate an MCTP VDM targeting a Bus Owner in an alternate message format and sending the encapsulated VDM across an alternate physical medium to reach the Bus Owner. The process in FIG. 5 is performed by processing logic that may comprise hardware (circuitry, dedicated logic, etc.), software (such as is run on a general purpose computer platform or a dedicated machine), or a combination of both.

Referring to FIG. 5, the process begins by processing logic receiving a MCTP VDM from a device transported on a PCI Express® protocol interconnect (processing block 500). Processing logic, upon receiving the VDM, determines whether the VDM is targeting the Bus Owner (processing block 502). If the VDM is not targeting the Bus Owner, then processing logic processes the VDM normally (processing block 504).

In many of the embodiments described in FIG. 5, the Bus Owner is coupled to a non-PCI Express® protocol interconnect. Additionally, the interconnect the Bus Owner is coupled to is not a MCTP-specific protocol. Thus, the physical medium the Bus Owner is coupled to does not have MCTP capabilities. Returning to the process flow, if the VDM is targeting the Bus Owner, then processing logic encapsulates the MCTP message content within the VDM in an alternate message format (processing block 506). The alternate message format is a non-MCTP format that is compatible with the interconnect the Bus Owner is coupled to, in many embodiments. Next, processing logic forwards the encapsulated message to the Bus Owner device using the alternate physical medium and the alternate message format (processing block 508).

In many of the embodiments described in the flow diagram of FIG. 5, a portion of the processing logic that is located in a PCI Express® Root Complex performs processing blocks 500 through 508. These steps are shown under the Root Complex header to the right of the thick dashed line. Another portion of the processing logic is located within the Bus Owner device. This portion of the processing logic performs processing blocks 510 through 514 on the left side of the thick dashed line in FIG. 5.

Continuing the process, processing logic within the Bus Owner device receives the alternate format message encapsulating the MCTP message from the Root Complex (processing block 510). Then processing logic extracts the MCTP message content from the alternate format message (processing block 512). Finally, processing logic parses the extracted MCTP message and performs a MCTP Bus Owner function in response to the message (processing block 514) and the process is finished.

Although the specification focuses on a PCI Express® implementation of an MCTP platform management subsystem, it should be clear that this is only for illustrative purposes and other underlying bus protocols and media could be utilized as the transport protocol of the MCTP messages and packets. These could include, but would not be limited to a System Management Bus (SMBus), an Inter-Integrated Circuit ($I^2C$) bus, and a Universal Serial Bus (USB), among other implementations.

Thus, embodiments of a method, apparatus, and system to reroute a Management Control Transport Protocol (MCTP) manageability message from one device to a second device are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
storing, by a Root Complex, routing information received from a routing update vendor defined message sent by a management component transport protocol bus owner;
receiving, from a first end-point device coupled to the Root Complex, a Vendor Defined Message directed to the management component transport protocol bus owner and having a target address that corresponds to the Root Complex;
replacing, by the Root Complex, using the routing information, the target address with an address of a second end-point device that is operating as the management component transport protocol bus owner; and
rerouting, by the Root Complex, the Vendor Defined Message to the second end-point device, wherein the first end-point device is unaware of the rerouting.

2. The method of claim 1, wherein replacing comprises modifying a Vendor Defined Message header target address.

3. The method of claim 1, further comprising:
forwarding, by the Root Complex, the Vendor Defined Message to a third end-point device;

rerouting, by the third end-point device, the Vendor Defined Message to the Management Component Transport Protocol Bus Owner, using the routing information.

4. The method of claim 1, wherein the Vendor Defined Message comprises a Management Component Transport Protocol manageability message.

5. The method of claim 4, further comprising:
receiving, by the Root Complex, a broadcast message from the Management Component Transport Protocol Bus Owner, wherein the broadcast message contains an originating address of the Management Component Transport Protocol Bus Owner;
replacing, by the Root Complex, the originating address in the broadcast message with the Root Complex address; and
sending, by the Root Complex, the broadcast message with the Root Complex address to one or more devices.

6. The apparatus of claim 1, wherein the Root Complex is further operable to:
receive a broadcast message from the Management Component Transport Protocol Bus Owner, wherein the broadcast message contains an originating address of the Management Component Transport Protocol Bus Owner;
replace the originating address in the broadcast message with the Root Complex address; and
send the broadcast message with the Root Complex address to one or more devices on the interconnect.

7. An apparatus, comprising:
a memory to store at least rerouting information to a Management Component Transport Protocol Bus Owner; and
a Root Complex to
store the rerouting information received from a routing update vendor defined message sent by the management component transport protocol bus owner;
receive a Vendor Defined Message directed to the management component transport protocol bus owner and having a target address that corresponds to the Root Complex, from a first end-point device over an interconnect;
replacing the target address with an address of a second end-point device that is operating as a management component transport protocol management controller; and
reroute the Vendor Defined Message to the second end-point device using the rerouting information, wherein the first end-point device is unaware of the rerouting.

8. The apparatus of claim 7, wherein the Vendor Defined Message comprises a Management Component Transport Protocol manageability message.

9. The apparatus of claim 7, wherein the second end-point device includes a firmware component, the firmware component comprising:
memory storage to store routing information sent from a third end-point device that is operating as the Management Component Transport Protocol Bus Owner; and
routing logic operable to use the routing information to reroute the Vendor Defined Message to the third end-point device.

10. A system, comprising:
a first interconnect;
a first device, coupled to the first interconnect, the first device to send a Vendor Defined Message directed to a management component transport protocol bus owner and having a target address of a second device coupled to the first interconnect, wherein the first device is a first end point device;
the second device to receive the Vendor Defined Message sent from the first device; and forward the Vendor Defined Message to a third device, wherein the first device is unaware of the forwarding;
the third device including:
memory storage to store routing information received from a routing update vendor defined message sent from the Management Component Transport Protocol Bus Owner, and
routing logic operable to use the routing information to reroute the Vendor Defined message to a fourth device; and
the fourth device configured to operate as the Management Component Transport Protocol Bus Owner; wherein the fourth device comprising an end point device.

11. The system of claim 10, wherein the Vendor Defined Message comprises a Management Component Transport Protocol manageability message.

12. The system of claim 10, wherein the second device comprises a Root Complex.

13. The system of claim 12, wherein the Management Component Transport Protocol Bus Owner is operable to send routing information in another routing update Vendor Defined Message to the Root Complex.

14. The system of claim 13, wherein the Root Complex is further operable to store the routing information sere-received from the Management Component Transport Protocol Bus Owner; and
use the routing information to reroute the Vendor Defined Message to the Management Component Transport Protocol Bus Owner.

15. The system of claim 14, wherein the routing information comprises a bus-device-function number.

16. The system of claim 14, wherein the Root Complex is further operable to:
receive a broadcast message from the Management Component Transport Protocol Bus Owner, wherein the broadcast message contains an originating address of the Management Component Transport Protocol Bus Owner;
replace the originating address in the broadcast message with Root Complex address; and
send the broadcast message with the Root Complex address to one or more devices on the first interconnect.

17. The system of claim 12, wherein the Management Component Transport Protocol Bus Owner is operable to send routing information in another routing update Vendor Defined Message to the third device.

18. The system of claim 17, wherein the third device includes a firmware component, the firmware component comprising:
memory storage to store the routing information sent from the Management Component Transport Protocol Bus Owner; and
routing logic operable to use the routing information to reroute the Vendor Defined Message to the Management Component Transport Protocol Bus Owner.

19. The system of claim 12, wherein the first interconnect comprises a PCI Express® protocol interconnect.

20. The system of claim 12, further comprising: a second interconnect, coupled to the Root Complex, wherein the first interconnect and second interconnect utilize different protocols, and wherein the third device is coupled to the second interconnect.

21. The system of claim 20, wherein the second device is further operable to:

translate one or more Vendor Defined Message based Management Component Transport Protocol manageability messages utilizing the first interconnect protocol to one or more Management Component Transport Protocol manageability messages utilizing the second interconnect protocol.

22. The system of claim 21, wherein the protocol of the second interconnect is one of USB, SMBus/I2C, and RS-232.

23. The system of claim 21, wherein the third device is further operable to:
   implement one or more Bus Owner functions by encapsulating content within one or more manageability messages in a protocol other than Management Component Transport Protocol.

* * * * *